(12) United States Patent
Rango

(10) Patent No.: US 6,788,705 B1
(45) Date of Patent: Sep. 7, 2004

(54) TRANSMITTING DSL STARTUP PARAMETERS OVER A VOICE CHANNEL

(75) Inventor: Robert Americo Rango, Newport Coast, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/488,094

(22) Filed: Jan. 18, 2000

(51) Int. Cl.[7] .................................................. H04J 3/16
(52) U.S. Cl. ......................... 370/465; 370/493; 375/222
(58) Field of Search ........................... 375/222; 370/230, 370/480, 493, 496, 528, 494, 495, 465, 503, 352–356; 709/227, 228

(56) References Cited

U.S. PATENT DOCUMENTS

| | | | | |
|---|---|---|---|---|
| 5,889,856 | A | * | 3/1999 | O'Toole et al. ......... 379/399.02 |
| 6,137,839 | A | * | 10/2000 | Mannering et al. .......... 375/260 |
| 6,263,016 | B1 | * | 7/2001 | Bellenger et al. ........... 375/222 |
| 6,374,288 | B1 | * | 4/2002 | Bhagavath et al. .......... 709/203 |
| 6,400,759 | B1 | * | 6/2002 | Liu et al. .................... 375/222 |
| 6,442,195 | B1 | * | 8/2002 | Liu et al. .................... 375/220 |
| 6,477,595 | B1 | * | 11/2002 | Cohen et al. ................ 710/105 |
| 6,594,306 | B1 | * | 7/2003 | Mehrabanzad et al. ...... 375/222 |

* cited by examiner

Primary Examiner—Ajit Patel

(57) ABSTRACT

Digital Subscriber Line (DSL) modems allow high-speed data to be sent over telephone lines normally used for analog voice service. In cases of impaired DSL line performance, diagnostic information is passed over a more stable part of the channel, i.e. the voice band channel. For example, analog modems may be used to communicate over the voice band channel. The diagnostic information may include various types of information that the two non-connecting DSL modems see on their respective sides of the line. For example, all the parameters that each of the DSL modems establish during start-up can be part of the diagnostic payload transmitted by the analog modems. Parameters such as settings of frequency domain equalizer, line bit rates, settings of time domain equalizer, SNR, location within startup of start-up failure, signal shape, Reed-Solomon values, etc. may be passed. This allows for more rapid diagnosis of line problems and reduced human intervention, thereby saving both time and money in installing or operating DSL service.

16 Claims, 3 Drawing Sheets

TRANSMITTING DSL STARTUP PARAMETERS OVER A VOICE CHANNEL

BACKGROUND OF THE INVENTION

1. Field of the Invention

The present invention relates to the transmission of information over a digital subscriber line (DSL).

2. Description of the Related Art

The use of digital subscriber line (DSL) technology has increased in recent years, allowing high-speed (i.e., broadband) access from a central location, typically a telephone central office, to multiple subscribers in homes or offices. The particular advantage of DSL over various other forms of broadband communications is that DSL allows the use of existing copper telephone lines from the central office to the end user, often referred to as the "local loop", or simply "loop". These existing lines are relatively small gauge (e.g., 24 or 26 gauge) twisted pair copper conductors, and were originally intended for use with a single analog voice channel occupying a relatively low bandwidth of about 3 to 4 kHz. However, the use of quadrature amplitude modulation (QAM) has allowed higher-speed digital communications over these lines, typically allowing data rates on the order of several hundred kilobits per second (Kbps). In addition, most recent DSL work has been concentrated in the area of discrete multi-tone (DMT) technology, which allow multiple channels to be sent over modulated carriers that are spaced apart in frequency; see, for example, U.S. Pat. No. 3,511,936. That technique can increase the data rate to over 1 megabits per second (Mbps). A typical DSL application is for connecting the subscriber to the Internet via the telephone central office, but other uses are possible.

There are numerous implementations of the above techniques that allow for sending data at a variety of rates over various distances, with shorter line distances generally allowing for higher data rates. For example, ADSL (Asymmetric Digital Subscriber Line) allows for a higher transmission rate from the central office to the subscriber than vice-versa. ADSL also typically provides for retaining the lower frequency portion of the phone line for analog voice communication, often referred to as POTS (Plain Old Telephone Service), while the higher frequencies are reserved for data. The data rates are typically about 1.5 Mbps downstream, (i.e. from the network to the end user's PC) and 384 Kbps upstream (i.e. from the end-user's PC to the network) in the standard "G.Lite" version of ADSL.

Referring to FIG. 1, a typical ADSL network topology is illustrated. A central office 100 includes a POTS splitter 101 that interfaces with the twisted pair subscriber line 108, and provides an analog signal to the POTS line care 102 and a digital signal to the ADSL line card 103. The POTS line card in turn interfaces with the voice switch 104, for example a 5ESS® electronic switch from Lucent Technologies Inc., which provides switched circuit access to the telephone network 106. The ADSL line card interfaces with the IP (Internet Protocol) router 105, which provides switched packet access to the Internet 107. The telephone subscriber line 108 connects to a subscriber 113, typically a home or office, and terminates in a POTS splitter 109, which provides voice frequencies to the telephones 111 and 112, and provides the data over higher frequencies to a personal computer (PC) 110. Note however that the G.Lite standard allows for eliminating the POTS splitter, by spacing the data frequency that carry the digital data sufficiently far in frequency from the lower analog frequencies that interference to the analog voice service is minimized. Then, the PC 110 and phones 111 and 112 may be directly connected to the subscriber line 108, although the use of low-pass filters for the phones 111 and 112 is recommended in some installations.

Referring to FIG. 2, an illustrative G.Lite subscriber line frequency spectrum is illustrated, wherein the analog voice frequencies 200 lie below the downstream (slow) data channel 201 and the upstream (fast) data channel 202. Both of the data channels comprise individually modulated tones that produce 256 bands approximately 4.3125 kHz wide (e.g., 203 and 204). The information in each band is allocated during modem training, so that more information is sent in a given band when the signal-to-noise ratio (S/N) is high, and less information is sent when the S/N is low. In this manner, the rate of information transmission may be maximized for a given subscriber line in the presence of phase and frequency response variations, cross talk, reflections, and noise from a variety of sources.

It is also known in the art to make use of the "analog" portion of the voice spectrum 200 for low-speed modems of the V. series (e.g., V. 32, V. 34 and V.90). The information transmitted or received by a modem may originate in digital form, for example computer files or Internet data, or in analog form, for example speech, that is converted to digital form. The modulation type depends on the particular V. series modem in use, but these modems are collectively referred to as "analog" modems because they utilize the POTS frequency portion of the telephone line; that is, below approximately 4 kHz. This limits the data rate to about 56 Kbps or less, which is referred to as "low speed" herein.

In order to establish high-speed DSL communications over the phone line, the modems at both ends must engage in a start-up sequence, often referred to as "handshaking". The various handshaking protocols depend on the variety of DSL in use, but usually determine at least the line loss, frequency and phase response of the line, so that proper line equalization can be achieved. The information determined during handshaking can also be used for echo cancellation purposes and reduction of certain types of cross talk. However, over certain loop conditions, the DSL modems may encounter difficult loop impairments. In some cases, the modems on both sides of the loop may not be able to establish a connection. To solve this problem, two engineers, one on either side of the local loop cable, communicate with each other via a separate phone line in order to pass diagnostic data. However, that technique is slow and does not allow the "automatic" handshaking mode to work. Furthermore, the intervention of trained personnel increases the time and expense required to establish the DSL service.

SUMMARY OF THE INVENTION

I have invented a technique and apparatus for passing startup information between DSL modems connected by telephone lines. In my invention, DSL modem startup parameters are passed in digital form over the voice band channel. For this purpose, analog V. series modems may be used to communicate over the voice band channel.

DETAILED DESCRIPTION

The present detailed description relates to a method and apparatus for establishing communications between high-speed DSL modems, which is especially useful in case the high-speed portion of the subscriber line is impaired. The impairment may be due to excessive noise, reflections, problems with phase or frequency response, or other factors. In cases of impaired DSL line performance, diagnostic information is passed over a more stable part of the channel, i.e. the voice band channel. For example, analog V. series modems (e.g., V.32, V.34, and V.90) may be used to communicate over the voice band channel; that is, using frequencies of less than about 4 kilohertz. The diagnostic information can include a number of parameters that the two non-connecting DSL modems see on their respective sides of the line. For example, all the parameters that each of the DSL modems establish during start-up can be part of the diagnostic payload transmitted by the analog V. series modems. Alternatively, only a few basic parameters may be exchanged before attempting to establish communication over the high-speed modem. Once the diagnostic payload is exchanged using the analog V series modems it could be used for multiple purposes; for example, it could be used by "on site" engineers to diagnose the problem, manually resetting DSL modem parameters and attempt a restart. Or, it may be useful for the DSL modems, where the DSL modems attempt a "automatic" restart with new parameters selected as a result of the diagnostic payload.

Figure 1:
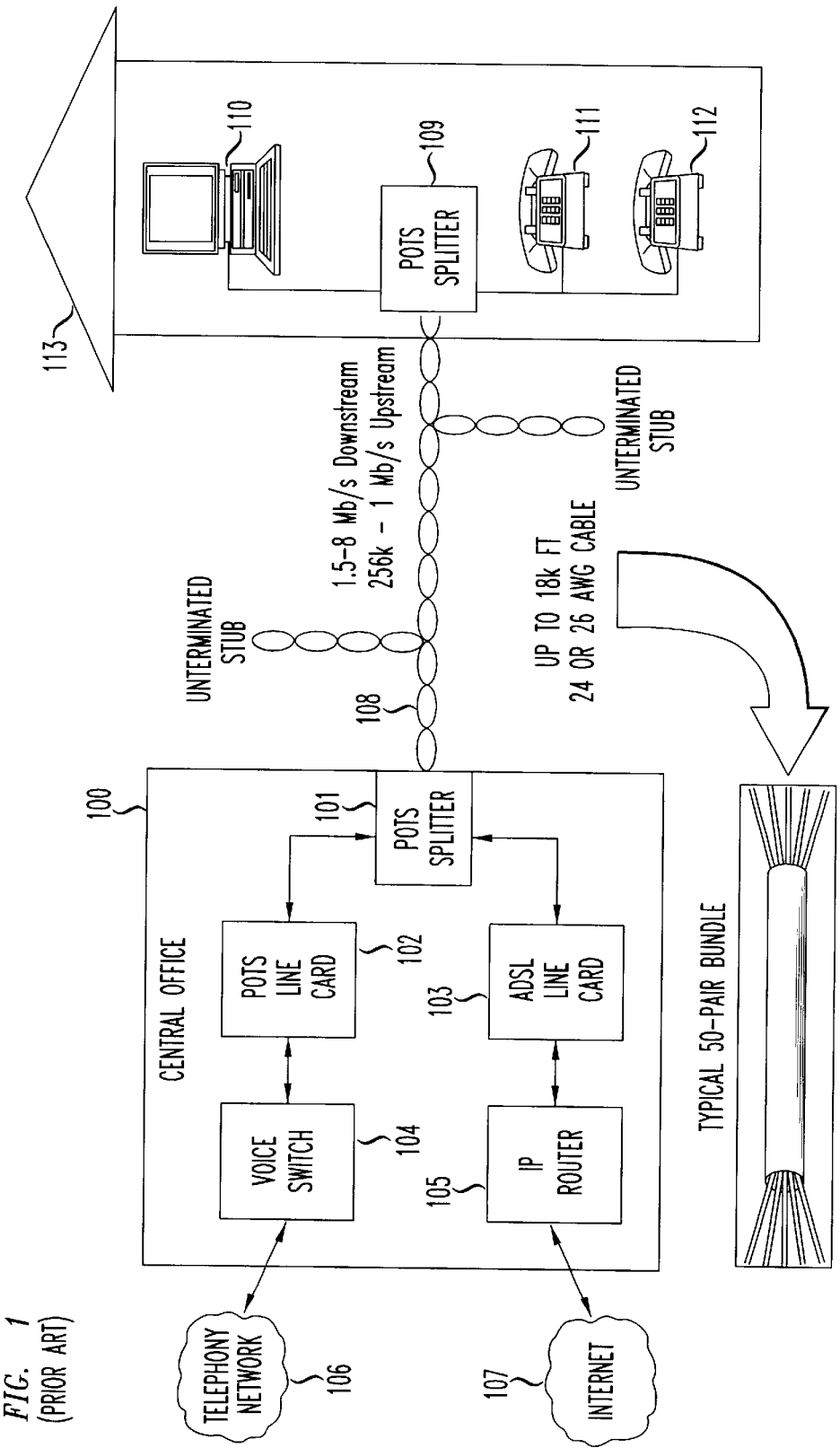
FIG. 1 shows an illustrative prior-art ADSL network topology.
Figure 2:
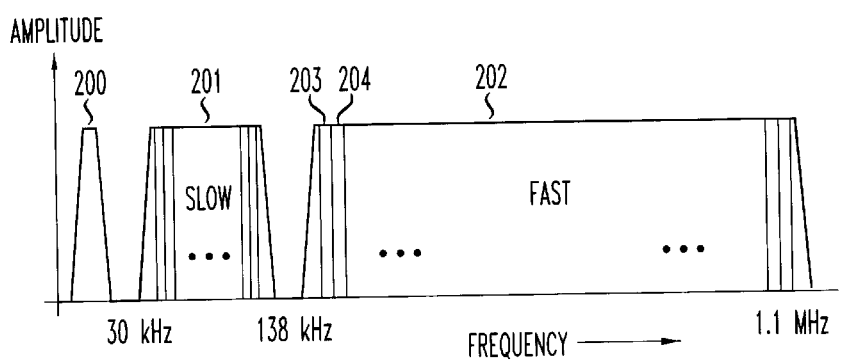
FIG. 2 shows the frequency channels in the G.Lite implementation of ADSL.
Figure 3:
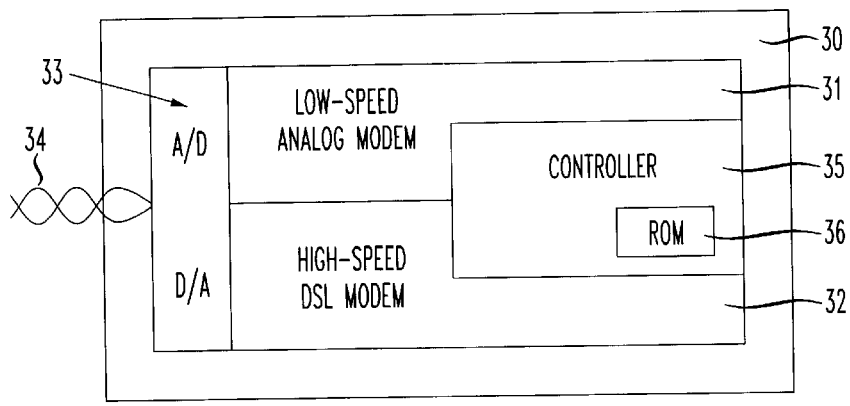
FIG. 3 shows an illustrative embodiment of the invention.

Referring to FIG. 3, an illustrative embodiment of the invention as implemented on the subscriber side of the line is shown. An analog (low-speed) modem 31 and a DSL (high-speed) modem reside on a circuit board 30. The modems may be implemented on separate integrated circuits (ICs), or the same IC. The circuit board may reside in a personal computer and connect by a PCI bus, PC Card bus or other bus type. Alternatively, the modems may reside directly on the main circuit board (motherboard) of the PC. In still another configuration, the modems may reside externally to the PC and communicate by a universal serial bus (USB) or other type of wired or wireless bus, including infrared and radio frequency types; for example, using the Bluetooth technique. The modems communicate with the subscriber line 34 through an analog-to-digital (A/D) converter when receiving data from the line, and through a digital-to-analog (D/A) converter when transmitting data to the line. These converters are shown collectively as block 33, which may conveniently and economically be shared by both modems if desired.

The modems are under the control of a controller 35, which is also shown as common to both modems, although separate controllers may be used. The controller may be the central processor unit (CPU) that is employed by the PC itself, referred to as the "host processor" if desired. In fact, the low-speed analog modem (31) itself will often be implemented in software run by the host processor. Eventually, even the high-speed modem (32) may be implemented by the host processor. The implementation on the central office side of the subscriber line may be similar, accounting for differences in the circuit board types and busses typically used for interfacing with the host processor.

In the normal start-up sequence for the DSL modem 32, the controller determines whether the proper parameters have been received from the far end, and conducts the handshaking operation according to a standard protocol if the appropriate information is received. However, in some cases an insufficient amount of data (or no data at all) is received to allow for the handshaking to proceed. In that case, the controller implements a fail-safe startup program, illustratively stored in read-only memory (ROM) 36, that instructs the analog modem 31 to send the appropriate parameters to the far end. These parameters typically include the settings of the frequency domain equalizer, desired line bit rates (adaptive or fixed), settings of the time domain equalizer, signal-to-noise ratio (SNR), the location within the startup sequence of the start-up failure, signal shape, Reed-Solomon values, line loss (attenuation), frequency and/or phase response of the line, failure diagnostic information, etc. There are still other types of information that may be passed, depending on the particular form of DSL being employed, for example. Note that the fail-safe startup program may alternatively reside on a disk drive or EEPROM, or other form of non-volatile memory. If the memory is of the re-writeable variety, then the startup parameters may be modified by subsequent learning experience for the particular line conditions encountered, if desired.

It is apparent that the low-speed analog modem should be maintained in a state of readiness to receive the start-up parameters during times that a high-speed communication session is not taking place. If desired, the low-speed modem may be placed in such a state manually during known start-up periods, or may automatically revert to such a state to be ready to establish communications as necessary.

Figure 4:
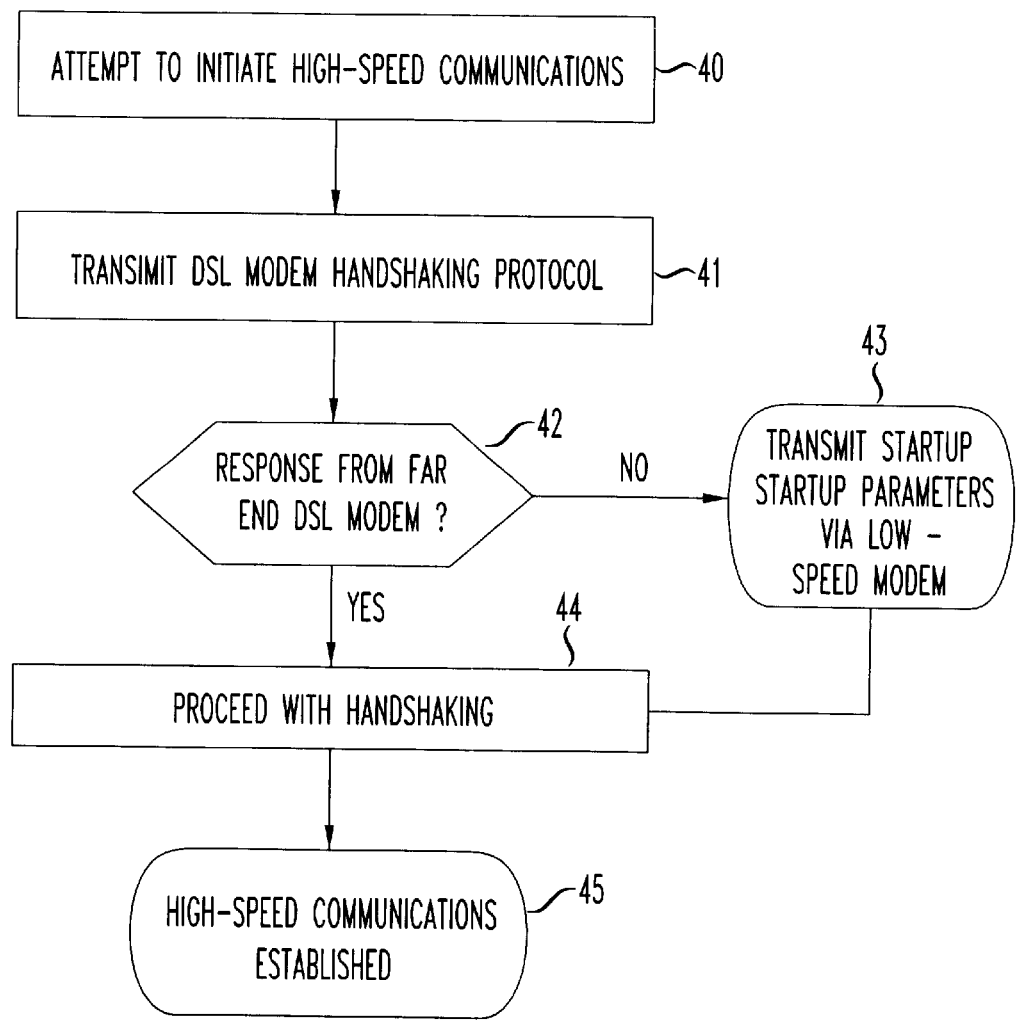
FIG. 4 shows a flow chart illustrating a typical sequence of operations.

Referring to FIG. 4, an illustrative flow chart shows a typical sequence of operations during a start-up situation on an impaired subscriber line. Should the exemplary DSL modems be unable to establish high-speed communications in steps 40, 41 and 42, then transmit start-up parameter values for the DSL modems are communicated via low-speed modems in step 43. Then with the correct modem values loaded in the DSL modems, normal handshaking and high-speed communications are established by the DSL modems in steps 44 and 45.

While the foregoing operation has been described for providing startup information over impaired lines, it may be used with non-impaired lines as well. For example, during an initial installation, it may be expedient to employ the present technique on all lines whether they are impaired or not, in order to ensure that communication is initially established if possible. Similarly, if high-speed communication is lost for a lengthy period of time, the present technique may be used to re-establish communications over the telephone lines. Still other applications are possible.

I claim:

1. A method of establishing the operation of DSL modems connected by a telephone line, wherein the DSL modems are adapted to transmit digital data at high frequencies while allowing analog voice transmission over lower frequencies, characterized by transmitting startup information for digital transmission from one of said DSL modems to another other of said DSL modems by means of analog signals utilizing said lower frequencies.

2. The method of claim 1 wherein said lower frequencies are less than 4 kilohertz.

3. The method of claim 1 wherein said DSL modems implement the G.Lite standard.

4. The method of claim 1 wherein said startup information includes at least one of: frequency response, phase response, line loss, Reed-Solomon values, signal shape, equalizer settings, sequence failure information, diagnostic information, and intended bit rate.

5. The method of claim 1, wherein said startup information is transmitted by a low-speed modem.

6. The method of claim 5, wherein said low-speed modem is a V. series analog modem.

7. The method of claim 5, wherein said startup information is transmitted by the low-speed modem if one of said DSL modems is unable to establish communications with said other DSL modem.

8. A DSL modem adapted to operate in accordance with claim 1.

9. Apparatus comprising a high-speed DSL modem having DSL portion and analog modem portion, and further comprising a low-speed analog modem, and wherein said apparatus is adapted to send startup information for said DSL portion by said analog modem portion.

10. The apparatus of claim 9 wherein said low-speed analog modem is adapted to operate on a subscriber telephone line using frequencies of less than 4 kilohertz.

11. The apparatus of claim 9 wherein said high-speed DSL modem implements the G.Lite standard.

12. The apparatus of claim 9 comprising an analog-to-digital converter, a digital-to-analog converter, and a controller.

13. The apparatus of claim 12 wherein said controller is the central processor of a personal computer.

14. The apparatus of claim 9, wherein said low-speed modem passes start-up information when the DSL modem is unable to communicate with another DSL modem.

15. The apparatus of claim 14, wherein said low-speed modem is a V. series analog modem.

16. The apparatus of claim 9, wherein said startup information includes at least one of: frequency response, phase response, line loss, Reed-Solomon values, signal shape, equalizer settings, sequence failure information, diagnostic information, and intended bit rate.

* * * * *

UNITED STATES PATENT AND TRADEMARK OFFICE
CERTIFICATE OF CORRECTION

PATENT NO. : 6,788,705 B1
DATED : September 7, 2004
INVENTOR(S) : Robert A. Rango It is certified that error appears in the above-identified patent and that said Letters Patent is hereby corrected as shown below:

Title page,
Item [73], Assignee, delete "Lucent Technologies Inc., Murray Hill, NJ (US)" and insert -- Agere Systems Inc., Allentown, PA -- therefor.

Signed and Sealed this

Ninth Day of November, 2004

JON W. DUDAS
*Director of the United States Patent and Trademark Office*